Figure 1:
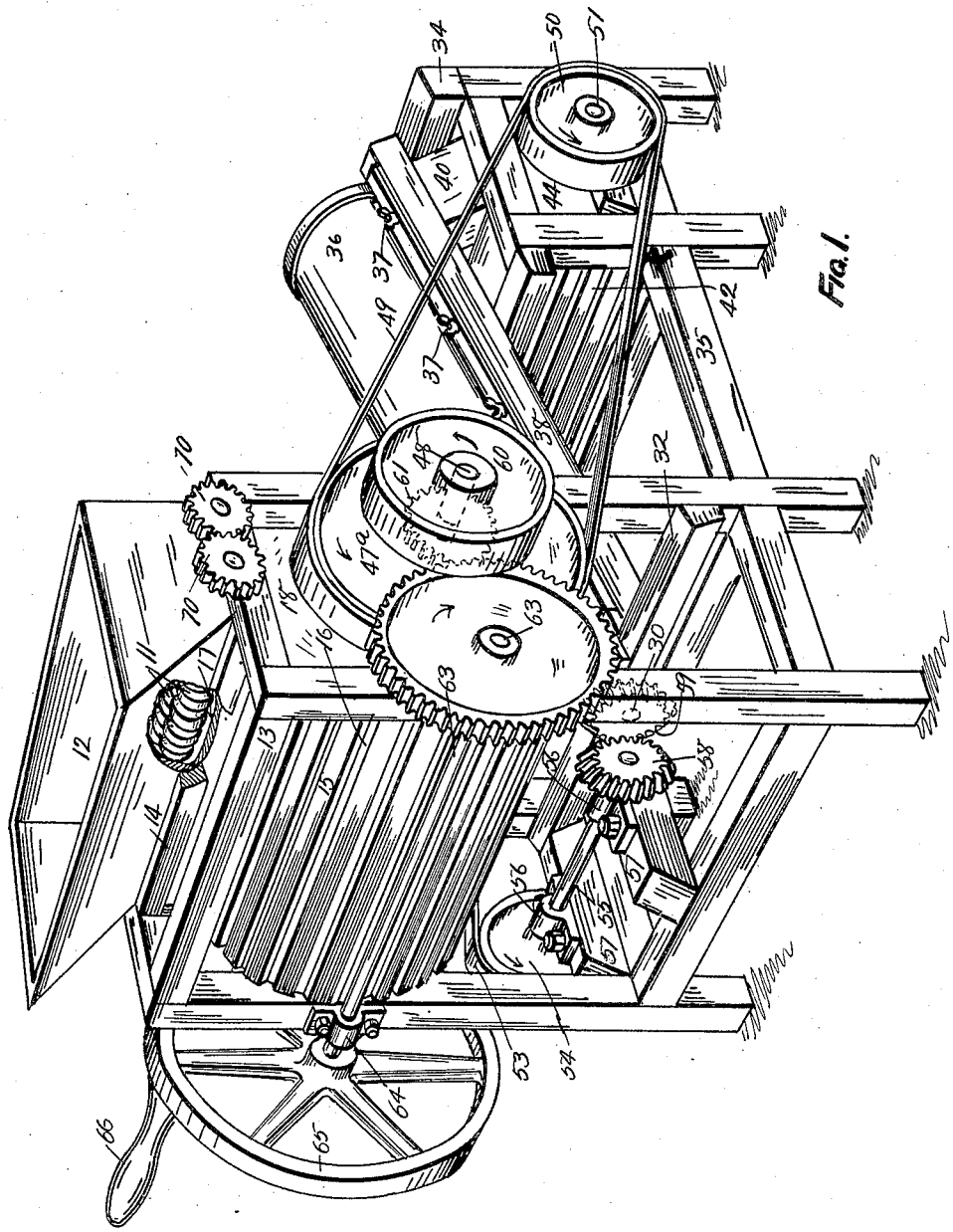
Figure 2:
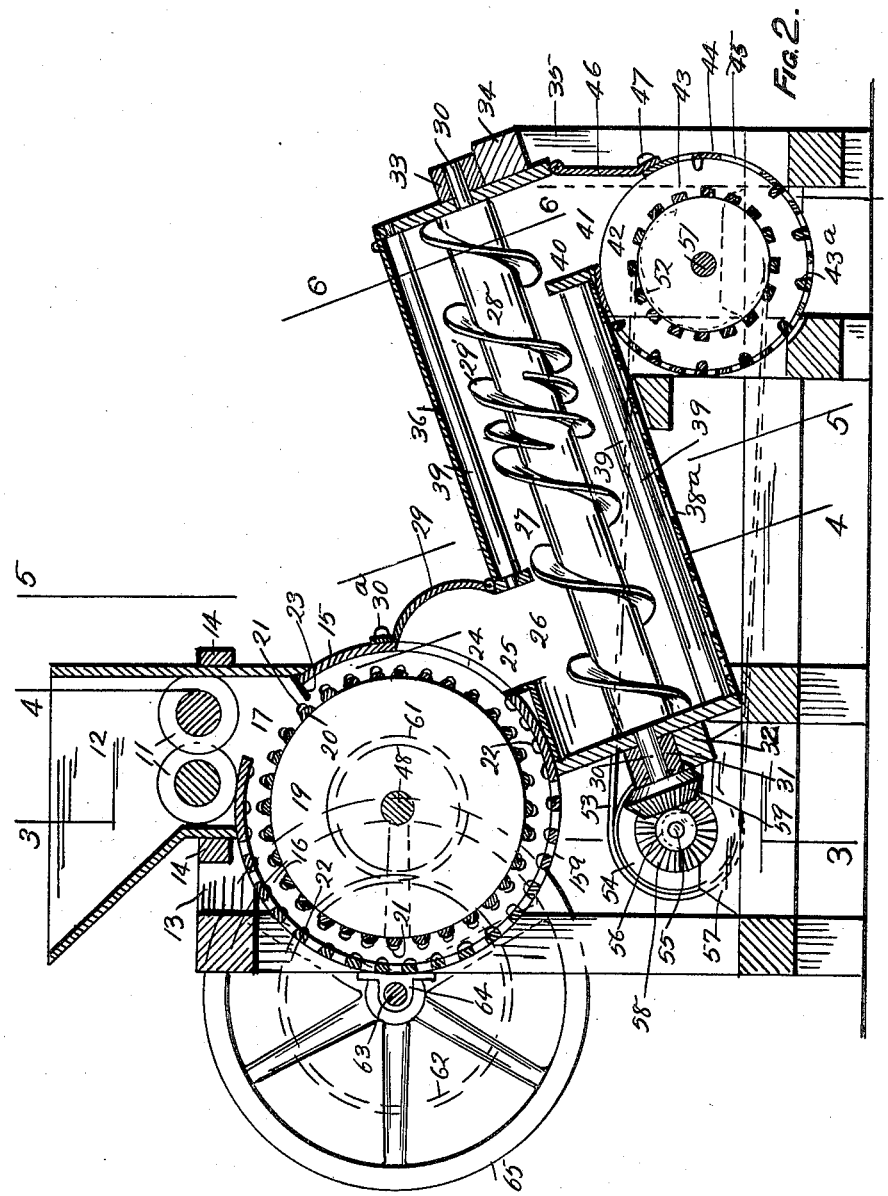

S. WARE.
MACHINE FOR TEASING AND CLEANING FIBROUS MATERIALS.
APPLICATION FILED MAY 11, 1912.

1,075,076.

Patented Oct. 7, 1913.

6 SHEETS—SHEET 1.

S. WARE.
MACHINE FOR TEASING AND CLEANING FIBROUS MATERIALS.
APPLICATION FILED MAY 11, 1912.

1,075,076. Patented Oct. 7, 1913.
6 SHEETS—SHEET 2.

S. WARE.
MACHINE FOR TEASING AND CLEANING FIBROUS MATERIALS.
APPLICATION FILED MAY 11, 1912.

1,075,076.

Patented Oct. 7, 1913.
6 SHEETS—SHEET 3.

S. WARE.
MACHINE FOR TEASING AND CLEANING FIBROUS MATERIALS.
APPLICATION FILED MAY 11, 1912.

1,075,076.

Patented Oct. 7, 1913.
6 SHEETS—SHEET 4.

Witnesses:—
Charles B. Crompton
Fred Pohl

Inventor.
Stephen Ware.
By Croydon Marks
Attorney.

S. WARE.
MACHINE FOR TEASING AND CLEANING FIBROUS MATERIALS.
APPLICATION FILED MAY 11, 1912.
1,075,076.
Patented Oct. 7, 1913.
6 SHEETS—SHEET 5.
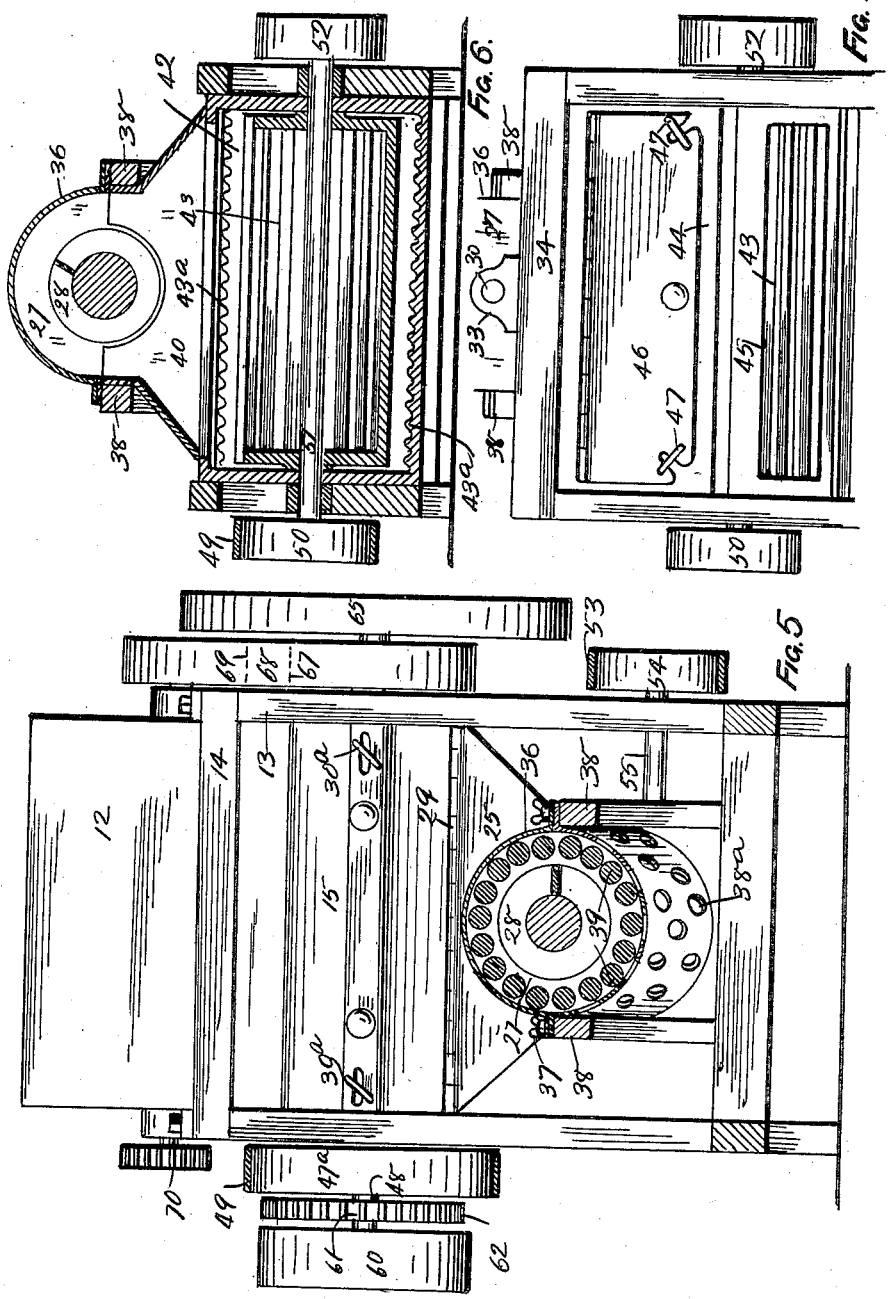
Witnesses:—
Charles B Crompton
Fred Pohl
Inventor.
Stephen Ware.
By E. Broydon Marks
Attorney.

S. WARE.
MACHINE FOR TEASING AND CLEANING FIBROUS MATERIALS.
APPLICATION FILED MAY 11, 1912.
1,075,076.
Patented Oct. 7, 1913.
6 SHEETS—SHEET 6.
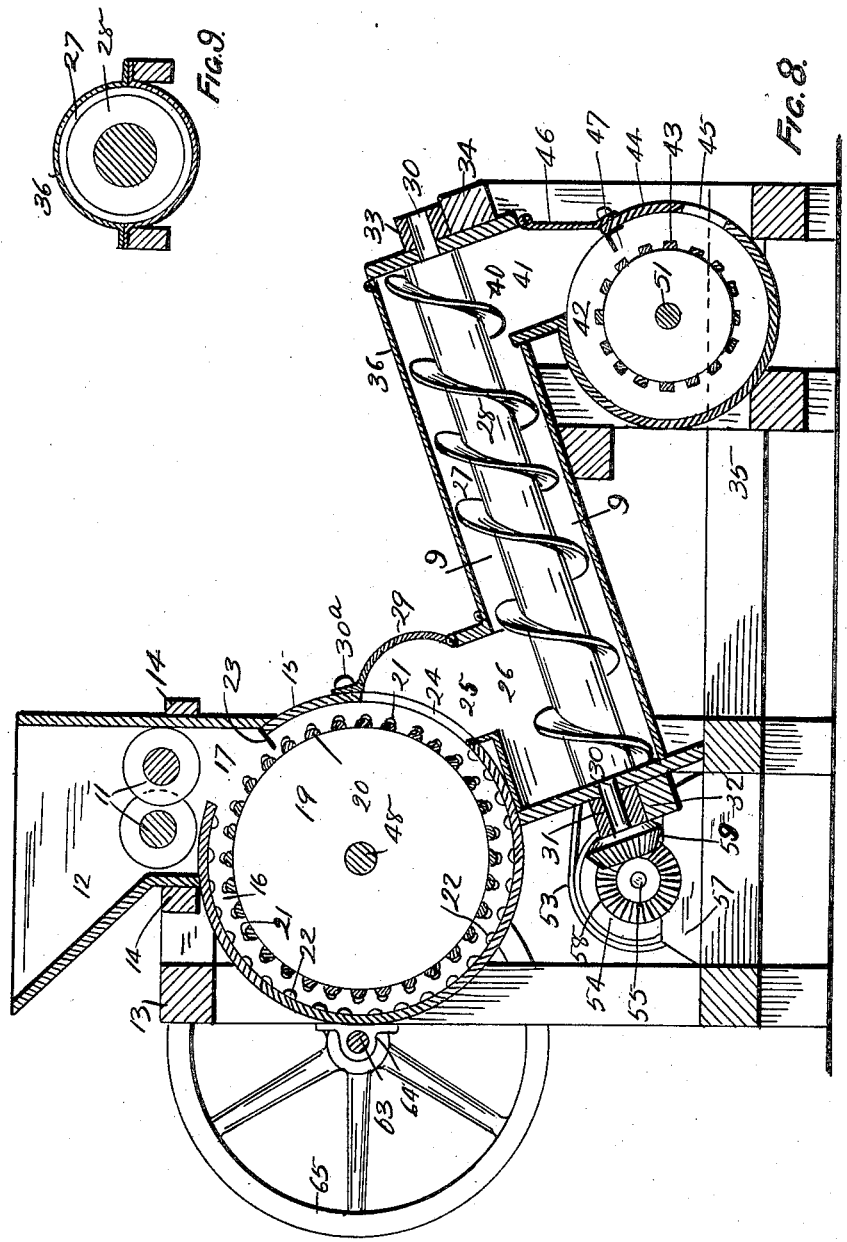

UNITED STATES PATENT OFFICE.

STEPHEN WARE, OF HORNSBY, NEW SOUTH WALES, AUSTRALIA.

MACHINE FOR TEASING AND CLEANING FIBROUS MATERIALS.

1,075,076.

Specification of Letters Patent.

Patented Oct. 7, 1913.

Application filed May 11, 1912. Serial No. 696,746.

*To all whom it may concern:*

Be it known that I, STEPHEN WARE, a subject of the King of Great Britain and Ireland, residing at Hornsby, in the State of New South Wales, Commonwealth of Australia, have invented certain new and useful Improvements in Machines for Teasing and Cleaning Fibrous Materials, of which the following is a specification.

The present invention appertains to the scutching or teasing or cleaning of fibrous materials such as capoc, cow-hair, cocoa-nut fiber and the like, and has been devised to effect an improved machine or apparatus for that purpose, such machine being fully automatic in operation and adapted for treatment of various forms of fibrous materials.

According to this invention an improved machine for the purpose before recited consists primarily of a pair of beating or batting chambers with an interposed screw elevator for conveying the material forward from the first and main chamber to the second chamber underlying the forward end of the said elevator and from which latter chamber the material is finally delivered in the teased or scutched condition.

In the preferred construction and for the treatment of fine short fibrous substances such as capoc, the beating process is effected within closed beating chambers, the mechanical integer constituting the beater in each of the pair of chambers comprising a longitudinally slatted rotatable drum the slats of the first and main beater being provided with projections or buttons and the casing of such beater having similar projections on the internal periphery staggered relatively to those positioned on the beater slats.

In the preferred and modified construction for the treatment of long or coarse fibrous material the casing of each of the beating chambers is perforated to permit egress of the dust or other foreign matter separated by the beating process, and each of said casings is provided with internal projections, and furthermore, every alternate slat of the second beater drum is transversely corrugated. The screw of the elevator or conveyer is also broken or mutilated at intervals, say half a convolution between each pair of main convolutions which are successively staggered, and surrounding and longitudinally parallel with the screw of the elevator are positioned in close proximity to each other a series of rollers forming a casing for the said elevator.

The pair of rotatable slatted beater drums and the intermediate screw elevator or conveyer are suitably geared together for positive motive power drive or manual operation.

Figure 3:
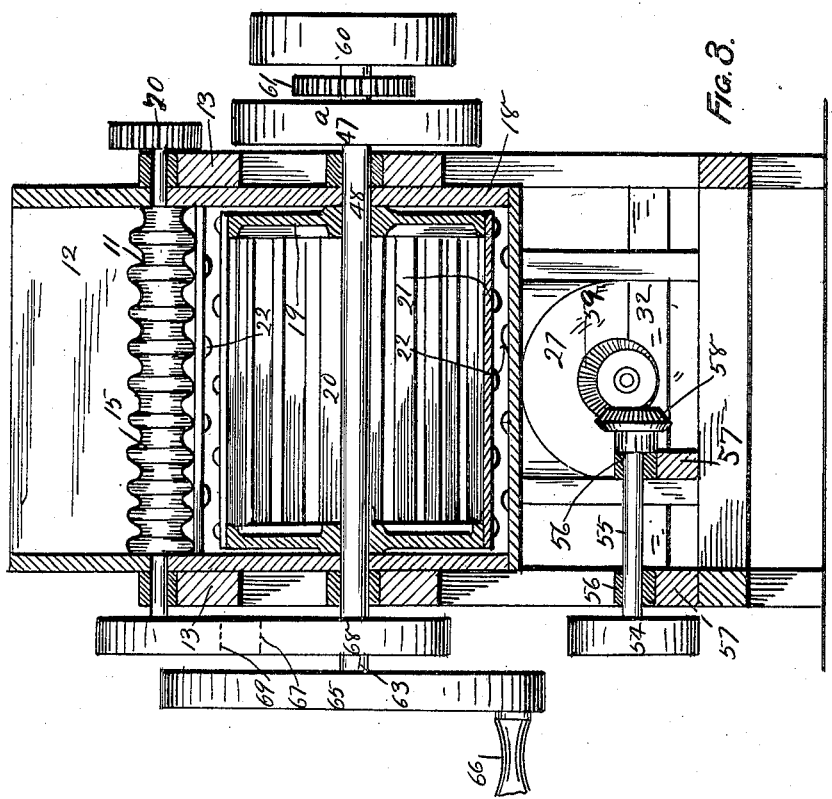
Figure 4:
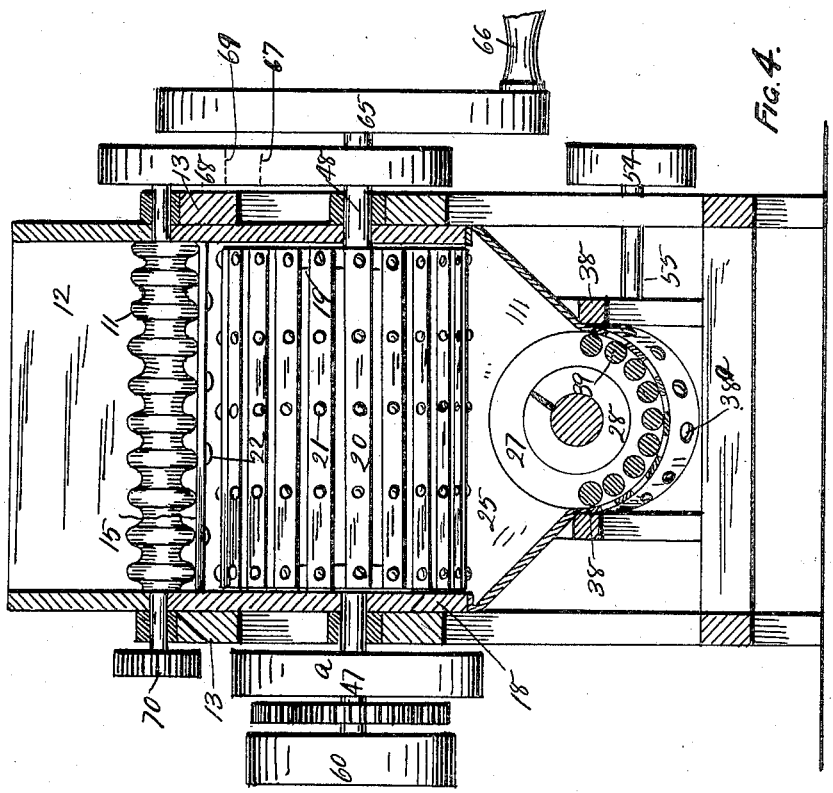

Referring now to the drawings accompanying and forming part of this complete specification and depicting construction in accordance with this invention:—Figures 1 to 7 inclusive illustrate the preferred construction of the machine for the treatment of coarse fibrous material while Figs. 8 and 9 depict a modified construction for fine or short fibrous substances. Fig. 1 is a perspective view of the machine, Fig. 2 being a longitudinal section of same. Figs. 3 and 4 are sectional elevations on lines 3—3 and 4—4 respectively of Fig. 2. Figs. 5 and 6 are sectional elevations on lines 5—5 and 6—6 respectively of Fig. 2. Fig. 7 is elevation of end of the second or supplementary and delivery beating chamber. Fig. 8 is longitudinal section of the modified construction of machine for treatment of fine material, Fig. 9 being a section through screw elevator or conveyer on line 8—8 of Fig. 8.

Referring particularly to Figs. 1 to 7 inclusive:—The receiving hopper 12 is positioned at the top of the framework 13, being removably secured to the transverse bearers 14, the bottom of same bearing upon the casing 15 of the main beater chamber 16, and communicating with said chamber 16 through longitudinal inlet orifice 17.

The main beating chamber 16 has closed ends 18, the mechanical integer constituting the beater consisting of the slatted drum 19, the slats 20 of which are spaced apart and are provided with projections or buttons 21 co-acting to effect the beating process with the projections or buttons 22 positioned on the inner periphery of the casing 15. The lower portion of the beating chamber casing 15 is provided with perforations 15ª for outlet of dust and foreign matter separated from the material.

The longitudinal baffle plate (23) is provided on the lower edge of the inlet orifice 17 of the chamber 16 to prevent the passage of the material down the said chamber directly to the outlet orifice 24 to chamber 25 communicating with inlet orifice 26 in the cylindrical casing 27 of the screw conveyer or elevator 28. One side of the chamber 25 is formed by the flap door 29 hinged to the said casing 27 and held in the closed position by turn buttons 30a secured in the casing 15 of the beater chamber 16. The conveyer shaft 28 has stepped down or reduced ends 30 secured in bearings 31 and 33 the former bearing being mounted on transverse rail 32 contained in the framing 13 while the latter bearing (33) is mounted on the transverse rail 34 of the extension 35 of the said framing 13. Both ends of the screw conveyer casing are closed, the top portion of same comprising a cover 36 secured in the closed position by turn screws 37 in the sloping rails 38 of the framing extension 35, while the lower portion of said casing 27 has perforations 38a for the passage therethrough of separated foreign matter.

The screw 29′ on shaft 28 is mutilated or broken as shown to prevent the massing or packing of the material delivered at the forward end of same. Surrounding said screw and contained within the casing 27 are a series of rollers 39 positioned longitudinally and parallel therewith clearance being provided between the said rollers as shown. The rollers 39 positioned below the diametrical horizontal plane have their rearward ends taking in rear end of the casing 27 and their forward ends in the inner side of the hopper 40 while the rollers superposing or above said plane have their forward ends taking in the forward ends of the conveyer casing 27 and their rear ends in a semiannular member situated on the forward side of the inlet orifice 26. The rollers 39 coöperate with the screw conveyer to further the teasing, beating or batting action upon the fiber and at the same time serve or tend to equalize the delivery of such fiber to the hopper 40 and second or supplementary beating chamber 42.

The delivery orifice 41 in the forward end of the casing 27 communicates through the hopper 40 with the second or supplementary beating chamber 42 constructed similarly to (though smaller than) the main beating chamber 16 with the exception that buttons are not provided on the slats 43 of the beater drum, the said slats being instead transversely corrugated. The beater drum has closed ends and the casing 44 of same is provided with outlet orifice 45 (see Fig. 7) for delivery of the material from the machine.

The flap door 46 constituting the outer and forward side of the hopper 41 is hinged to and dependent from the bottom edge of the forward end of the conveyer casing 27 and is secured in the closed position by turn buttons 47 in the casing 44 of the supplementary beater.

The flap doors 29 and 46 and cover 36 are provided for machine inspection and cleaning purposes.

For effectively feeding the material to be treated into the main beating chamber 16 intermeshing feed rollers 11 are positioned in the bottom of the receiving hopper 12 and overlying the inlet orifice 17 of the main beating chamber 16.

The rotatable members of the machine are geared together by pulley 47a on shaft 48 of the main beater drum, being connected by belt 49 to pulley 50 on one end of shaft 51 of the supplementary beater drum, pulley 52 on other end of shaft 51 being connected by belt 53 to pulley 54 on one end of the shaft 55 having bearings 56 on transverse bearers 57 in lower portion of framing 13. The inner end of said shaft 55 has bevel wheel 58 meshing with a similar gear wheel 59 on rearward reduced end 30 of the shaft 28 of the screw conveyer.

The shaft 48 is extended and provided with pulley 60 for coupling to any positive rotary motive power or for manual operation. Said shaft extension has gear wheel 61 meshing with gear wheel 62, whose shaft 63 traverses the rear of the machine being mounted in bearings 64 on the framing 13 as shown and provided with wheel 65 adapted for manual actuation by handle 66.

On the shaft 48 is a pulley 67 having a belt 68 passing over pulley 69 affixed to one end of a corrugated roller 11. These rollers partially intermesh, and are geared with one another by gear wheels 70.

The direction of rotation of the various pulleys mentioned is indicated thereon by arrows.

In operation, coarse fibrous material being fed to the receiving hopper 12 the material is drawn downwardly by the intermeshing feed rollers 11 and fed through the inlet orifice 17 into the main beater chamber 16 where it is beaten and carried around by the slatted drum 19 to the outlet orifice 24 thence through chamber 25 to the screw conveyer by which it is further teased or scutched and carried upwardly and forwardly and delivered through hopper 40 to the supplementary beater chamber 42. The material is finally beaten or scutched in the chamber 42 and delivered from the machine through outlet 45.

The dust or other small particles of foreign matter separated from the material under treatment fall through the perforations 15a in the chamber 15, perforations provided in the underside of the conveyer casing 37 (see Fig. 2) and the perforations shown in the same figure in the casing 44 of the supplementary beater chamber 42.

Referring now to Figs. 8 and 9, the modified construction shown for treating fine fibrous matter, consists in having the casings for the beating chambers (16) and (42) closed or non-perforated as also the casing 27 of the screw conveyer. The projections or buttons 22 on the inner periphery of the casing of the supplementary beater chamber 42 are eliminated as also the rollers 39 surrounding the screw of the conveyer which has equal convolutions.

The operation of a machine constructed embodying the modifications depicted in Figs. 8 and 9 is identical with that described with reference to the machine depicted in Figs. 1 to 7 inclusive with the exception that the short fibers do not pass from the machine during its operation.

What I claim and desire to secure by Letters Patent is:—

1. A machine for teasing and cleaning fibrous materials comprising a pair of beating or batting chambers each containing a rotatable beater drum, a screw conveyer intermediate of said chambers for delivering material from the one to the other of said chambers, and means carried within said conveyer coöperating with the screw thereof to equalize the delivery of material from the one to the other of said chambers.

2. A machine for teasing and cleaning fibrous materials comprising a pair of beating or batting chambers each containing a rotatable beater drum, a screw conveyer intermediate of said chambers for delivering material from the one to the other of said chambers, and rotatable members carried within said conveyer coöperating with the screw thereof to regulate the delivery of material from the one to the other of said chambers.

3. The combination of a pair of cylindrical perforated beating or batting chambers each containing a slatted beater drum, with a screw conveyer or elevator interposed between said chambers, the screw of said conveyer having a mutilated second thread and the casing thereof comprising a series of longitudinally disposed rollers and an outer cylindrical cover perforated on the underside, the said drums and conveyer-screw being geared together by suitable gearing.

4. The combination of a pair of cylindrical beating or batting chambers each containing a slatted beater drum, with a screw-conveyer contained within a cylindrical casing, the screw of said conveyer having a mutilated second thread.

Signed at Sydney, New South Wales, this twenty fifth day of March, 1912.

STEPHEN WARE.

In the presence of—
 CHAS. HATTON,
 WM. NEWTON.